(No Model.)
J. O'DONNELL.
STONE CUTTER'S BUSH HAMMER.
No. 513,196. Patented Jan. 23, 1894.
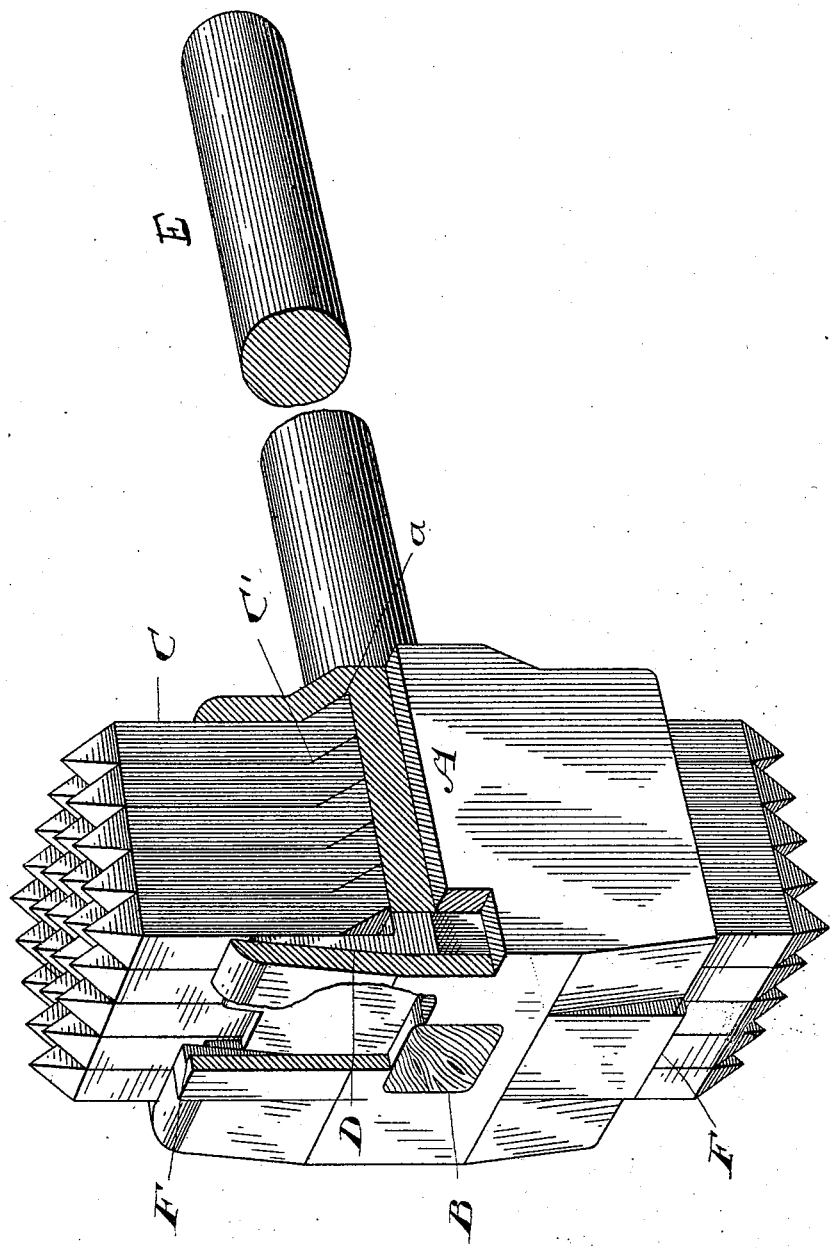
Witnesses
J. Edw. Maybee
W. G. McMillan
Inventor
James O'Donnell
by Donald G. Ridout & Co.
Attys.

UNITED STATES PATENT OFFICE.

JAMES O'DONNELL, OF TORONTO, CANADA, ASSIGNOR OF ONE-FOURTH TO CHARLES WATSON, OF SAME PLACE.

STONE-CUTTER'S BUSH-HAMMER.

SPECIFICATION forming part of Letters Patent No. 513,196, dated January 23, 1894.

Application filed April 19, 1893. Serial No. 470,961. (No model.)

*To all whom it may concern:*

Be it known that I, JAMES O'DONNELL, of the city of Toronto, in the county of York and Province of Ontario, Canada, have invented a certain new and Improved Stone-Cutter's Bush-Hammer, of which the following is a specification.

The object of the invention is to provide a bush hammer which may be quickly and easily sharpened and tempered, and in which the teeth may be readily replaced in the event of any one of them being broken, and it consists, essentially, of a casing designed to hold a series of pointed teeth bunched together and held in position by means of a wedge, substantially as hereinafter more particularly explained.

The drawing is a perspective view of my improved bush hammer partially broken away.

In the drawing, A, represents a double ended casing through the center of which a hole is made for the handle B. A series of pointed teeth C, are bunched together and fitted into each end of the casing A. These teeth are made of steel and pointed as indicated, each point being properly hardened and tempered. The stub end of each tooth is bent at C', the teeth being arranged as indicated in the drawing so that they shall fit up closely to each other into a dove-tailed recess *a*, made in the base of the casing A, so that when the wedge D, is driven into the casing A, behind the teeth C, the said teeth are rigidly held in position so that they cannot fall out either separately or collectively until the wedge D, has been removed.

It will be noticed that both ends of the casing A, are similarly filled with teeth so as to make the hammer double-ended as is the case in all bush hammers. The insertion of the handle E, locks the wedges in position so that the said wedges cannot be removed until the handle is knocked out of place. A narrow channel F, is made in each end of the case A, immediately in front of the edge of each wedge D, so that by removing the handle, each wedge can be knocked out by inserting a punch in the end of the channel F, and knocking the said wedge out of position by means of the said punch.

Among the advantages of my improved hammer over the old style of hammer, I may mention that the teeth being made separately, they can be removed for the purpose of being sharpened, or in the event of being broken, and may be reinserted without the slightest difficulty or loss of time; whereas in the old style of solid bush hammer, it is necessary to employ a skilled artisan to sharpen or repair the teeth in the event of their requiring attention; whereas in my hammer an ordinary blacksmith is able to do the necessary work and in many cases a handy man is sufficient.

In my improved hammer, it is merely necessary to keep a few sets of teeth sharpened and tempered to suit the different kinds of stone and they can be changed in the hammer by the party using it. When a tooth is broken it is only necessary to replace a single tooth instead of being obliged to cut down all the remaining teeth in order to make the hammer even.

What I claim as my invention is—

1. In a bush hammer, a casing, a series of teeth inserted therein, a wedge between said teeth and casing, and a handle passing through the casing and underneath said wedge whereby the handle prevents the wedge from slipping out of place, substantially as described.

2. In a bush hammer, a casing, a series of teeth inserted therein, a wedge between said teeth and casing, an opening for a handle under said wedge, and a channel in said casing alongside said wedge, substantially as and for the purpose described.

3. A casing A, having a dove-tail *a*, formed on one side of it, a series of teeth C, each tooth bent at C', and arranged in a bunch to fit together and into the dove-tail *a*, in combination with the wedge D, and handle E, substantially as and for the purpose specified.

Toronto, February 16, 1893.

JAMES O'DONNELL.

In presence of—
J. EDW. MAYBEE,
J. E. CAMERON.